US 8,849,710 B2

(12) United States Patent
Moghadam et al.

(10) Patent No.: US 8,849,710 B2
(45) Date of Patent: Sep. 30, 2014

(54) PROJECTION SHOPPING WITH A MOBILE DEVICE

(75) Inventors: Ali Minaei Moghadam, Haywards Heath (GB); John Lunn, Wargrave Berks (GB)

(73) Assignee: eBay Inc., San Jose, CA (US)

( * ) Notice: Subject to any disclaimer, the term of this patent is extended or adjusted under 35 U.S.C. 154(b) by 341 days.

(21) Appl. No.: 13/341,147

(22) Filed: Dec. 30, 2011

(65) Prior Publication Data

US 2013/0173433 A1      Jul. 4, 2013

(51) Int. Cl.
*G06Q 30/00* (2012.01)
*G06Q 30/06* (2012.01)

(52) U.S. Cl.
CPC ........ *G06Q 30/0643* (2013.01); *G06Q 30/0623* (2013.01)
USPC ........................................ 705/27.2; 705/26.61

(58) Field of Classification Search
CPC ................... G06Q 30/0623–30/00631; G06Q 30/0639–30/0643; G06Q 20/20; G06Q 20/201; G06Q 20/202
USPC ................... 705/1.1, 26.1–27.2, 16; 715/700, 715/716–718, 753, 863
See application file for complete search history.

(56) References Cited

U.S. PATENT DOCUMENTS

| | | | |
|---|---|---|---|
| 6,864,882 B2 * | 3/2005 | Newton | 345/173 |
| 7,580,866 B2 * | 8/2009 | Church | 705/26.41 |
| 8,345,835 B1 * | 1/2013 | Or-Bach et al. | 379/88.23 |
| 2005/0091118 A1 * | 4/2005 | Fano | 705/26 |
| 2007/0288332 A1 * | 12/2007 | Naito | 705/27 |
| 2008/0192027 A1 * | 8/2008 | Morrison | 345/177 |
| 2009/0322706 A1 * | 12/2009 | Austin | 345/175 |
| 2010/0228632 A1 * | 9/2010 | Rodriguez | 705/14.66 |
| 2012/0062445 A1 * | 3/2012 | Haddick et al. | 345/8 |
| 2012/0123673 A1 * | 5/2012 | Perks et al. | 701/426 |
| 2013/0078916 A1 * | 3/2013 | Glickman | 455/41.1 |

OTHER PUBLICATIONS

"Minority Report". Twentieth Century Fox Film Corporation. Released Jun. 21, 2002. (excerpt: http://www.youtube.com/watch?v=7bXJ_obaiYQ ).*
Minority Report Interface Made with Smart Glass. Aug. 17, 2011. http://teleautomaton.com/post/9051565582/minority-report-interface-made-with-smart-glass.*
"Minority Report Interface Is Real, Hitting Mainstream Soon (Video)". Aaron Saenz, Feb. 17, 2010.*

* cited by examiner

*Primary Examiner* — William Allen
(74) *Attorney, Agent, or Firm* — Haynes and Boone, LLP (57) ABSTRACT

A method for making purchases with a mobile device at a physical location is described. A service provider receives information about an item available for purchase, and this information is projected on a surface. A user in the vicinity of the surface views the projected information and provides input through the user's mobile device. The projected information changes based on the input. The user selects an item for purchase and pays for the selected item through the mobile device.

20 Claims, 4 Drawing Sheets

PROJECTION SHOPPING WITH A MOBILE DEVICE

BACKGROUND

1. Field of the Invention

The present invention generally relates to shopping using a mobile device at a physical location.

2. Related Art

Consumers and the general population are utilizing mobile devices, such as smart phones, more than ever before and not just to make and receive calls. The number of users, devices, and device capabilities continue to increase. One of the reasons for this increased use is the ease and/or convenience of performing tasks with a mobile device. These include accessing content, such as through the Internet or Apps, taking and sharing photos, videos, and music, playing games, listening to music, watching videos, shopping, and performing financial transactions, such as sending and receiving money.

Service providers are thus becoming more and more important for these mobile device users. Merchants, retailers, and marketplaces, such as eBay, Inc. of San Jose, Calif., enable users to shop online through their mobile devices. A payment provider, such as PayPal, Inc. of San Jose, Calif., allows users to complete an online shopping process by enabling users to send and receive payments through the mobile device. Thus, a user can find an item and make the purchase through the mobile device, and then have the purchased item delivered to the user. One difficulty with mobile device shopping, however, is a small screen and keyboard, making it hard for the user to search for items using the device, and the limitation of typically being able to run only one application at a time on the device.

For online transactions, consumers typically place items into a cart on a merchant or retailer website and make a payment directly to the merchant or through a payment provider service. For the former, payment can be made by providing credit card or bank account information. For the latter, the consumer may access an account managed by the payment provider, authorize payment, and have the payment sent to the merchant by the payment provider. The purchased items are then typically shipped to the consumer or the consumer picks up the items at a designated location, such as a store.

Although online shopping may be desirable in many situations, users may still want to make purchases at physical stores or locations. Thus, it is desirable to provide methods and systems that aid the physical shopping experience.

SUMMARY

A user with a mobile device can make purchases through the mobile device at a physical location while viewing items on a surface. Information about the items is projected onto the surface.

In one embodiment, a merchant uploads products or services to a service provider site, such as eBay, Inc. of San Jose, Calif., to create an online store for purchases. The user is able to communicate with the service provider site through the user's mobile device. Information about items available for purchase are projected onto a viewable surface proximate to the user. The user's mobile device controls the information on the surface, such as the color, orientation, or size of the item. The user's mobile device may then be used to select and purchase a viewed item.

In another embodiment, when a user logs into the service provider site, such as through the user's mobile device, the service provider determines the location of the user and determines whether the viewable surface and the user are sufficiently close. If the distance is too large, the service provider sends a message to the user's mobile device that the user is too far from the viewable surface. If it is determined that the user is close enough to the viewable surface, the service provider allows the user to continue shopping. The user can then make the purchase through the mobile device or other means and receive the purchased items.

These and other features and advantages of the present disclosure will be more readily apparent from the detailed description of the embodiments set forth below.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Figure 1:
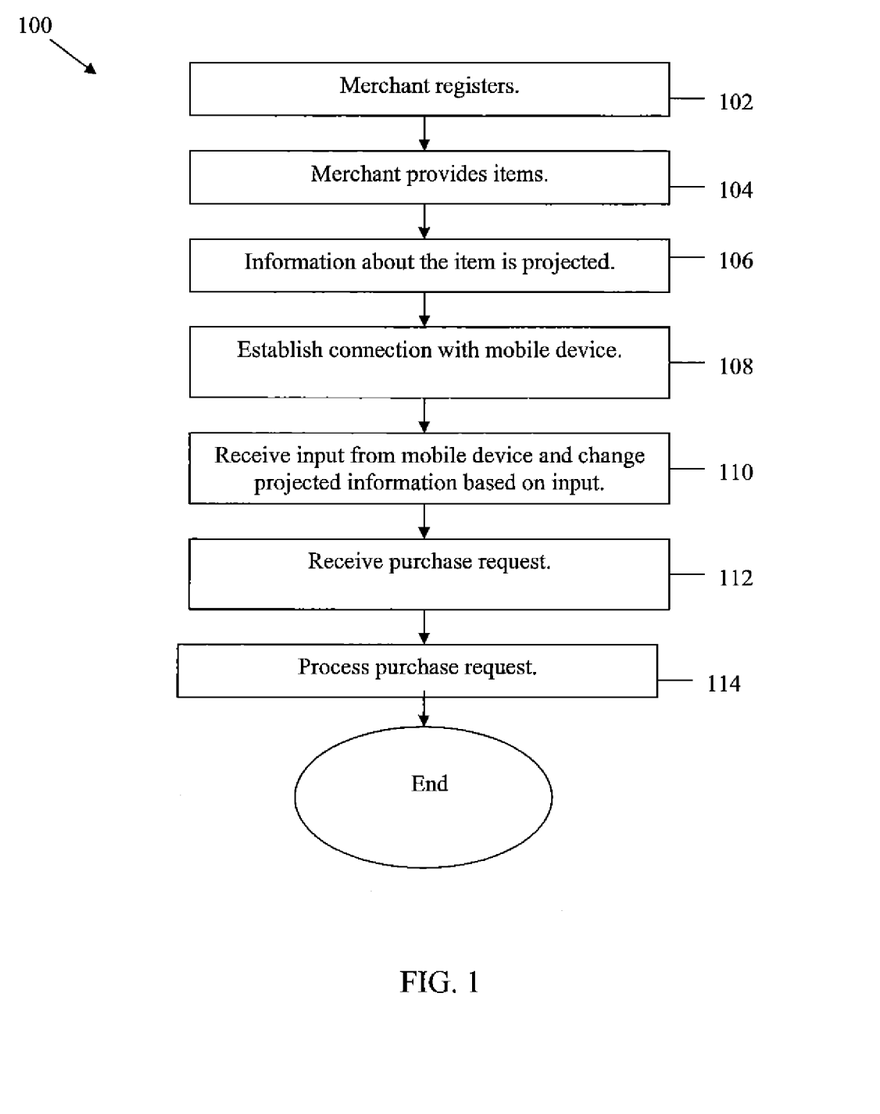
FIG. 1 is a flowchart showing a method of making purchases through a mobile device at a physical location according to one embodiment.

FIG. 1 is a flowchart 100 showing a method of making purchases through a mobile device at a physical location, according to one embodiment. At step 102, the merchant registers with a service provider, such as eBay or PayPal. Registration may include signing up for the service and agreeing to any terms required by the service provider, such as through a merchant device. In one embodiment, the merchant device is a mobile computing device, such as a smart phone, a PC, or a computing tablet. In other embodiments, registration may be done completely through the merchant device, partially through the merchant device, or without using the merchant device, such as through a phone call or in-person visit to a representative of the service provider.

The merchant may be requested to provider specific information for registration, such as, but not limited to, a merchant name, type of goods/services offered, address, location(s) of planned sales, phone number, email address, website address (if applicable), social security or tax ID number, a user name for the account, and a password or PIN for the account. The type of information may depend on whether the user already has an account with the service provider. Even if the merchant has an account, the merchant may be requested to register for this particular service, such as by providing specific information and agreeing to certain terms and conditions. Requested information may be entered through the merchant device or other means, including voice or manual key entry. Once all the requested information is received and confirmed, the service provider may create an account for the merchant and/or offer the service to the merchant.

After registration, the merchant may provide the service provider a list of items available for purchase at step 104. Items may include services, products, donations, and any other tangible or intangible offering that a user can make a payment for. Item information may include providing descriptions, item identifiers, prices, quantity available, photos/images, and any other desired information. The merchant may communicate the information in various ways, including through a merchant portal offered by the service provider, email, text, a phone call, fax, or any suitable means. In one embodiment, the merchant may provide any information desired by the merchant and in any format. In other embodiments, the service provider may require specific information and/or formats. For example, if an item is clothing, the service provider may have specific fields that will be required to be filled in, such as by the merchant selecting from a drop-down menu or the merchant manually entering information through the merchant device, either by voice or key entry.

At step 106, information about an item for purchase is projected onto a surface viewable by a consumer or user, and the consumer views the projected information. For example, if the item is a piece of clothing, e.g., a shirt, the projected information may include the image, price, size, color, and/or description of the item. The surface is any suitable surface that an image can be projected on, including a screen or display. For example, the surface may be transparent, such as glass, or it may be opaque. In one embodiment, the surface is a window, such as a store display window or a car window. In another embodiment, the surface includes a photographic or holographic film. An exemplary film is 3M™ Vikuiti™ Rear Projection Film. The surface generally has a larger area than the area of a screen or display of a mobile device.

At step 108, a connection between the service provider and the user's mobile device is established. In one embodiment, the user installs the ScreenReach (Screach) application onto the user's mobile device, e.g., a smartphone or PDA (or the Screach application is incorporated into a custom written application that is installed on the mobile device). Screach is a unique digital media platform that allows anyone to create real time, two way interactive experiences between a smart device—through the Screach Application—and any content on any screen, or within the mobile device itself. Details of the Screach application may be found at www.screenreach.com.

In the present methods, the Screach application provides the connection between the user's mobile device and the Screach-enabled content of the service provider. Typically, a user approaches the viewable surface and enters the code provided on the surface into the Screach application running on the mobile device. The application confirms that the mobile device and the Screach-enabled content are connected, and the mobile device is transformed into a controller that interacts with the projected information. In one embodiment, once the connection is made, the projected information is also visible on the display of the mobile device.

Next, at step 110, the user controls the projected information with the mobile device to change what the user sees. Only one user should be able to control the projected information at any time. The service provider receives input from the user through the mobile device and changes the projected information based on the input. In one embodiment, the user is provided a list or other indication of available items for purchase from the merchant connected through the Screach application. The user may then select one or more items from the user's mobile device for viewing on the projected display. The mobile device user responds to or interacts with the projected information, which generates additional inputs for the user. For example, the user provides input by way of selecting from the multiple choices and options provided on the viewable surface, further guiding the service provider to generate and deliver additional interactive media on the viewable surface. The user can view and interact with the projected information on a larger display, i.e., the viewable surface, rather than the small screen of the mobile device.

In one exemplary embodiment, the user may rotate the image of an item to view different sides of the item, change the color of an item, and/or select the size of the item. In response to this user input, the service provider presents an updated display on the viewable surface with new interactive media that includes a corresponding new set of option buttons and multiple choices, etc. Then the user continues to guide the dynamic interactive media generation by selecting a specific option button, in response to which the mobile device receives a next option of the current interactive media or a new one altogether, and so on.

When the user finds an item he or she wishes to buy, the user selects the item for purchase and purchases the selected item through the user's mobile device. The selection and payment screens are generally not projected onto the viewable surface to maintain privacy, and are viewable only on the user's mobile device. The selection may be accomplished by tapping or checking links or buttons associated with desired items on the user's mobile device. For example, the user may see a "Add to Cart," "Purchase," or similar button associated with each item. The user may select such a button to indicate a desire to purchase that item. This information or purchase request is conveyed electronically to the service provider and/or the merchant, such as through the mobile device carrier.

The purchase or payment request is then communicated to and processed, at steps 112 and 114, by the service provider. As part of the processing, the user may be requested to transmit additional information as needed, such as a user name, email address, phone number, password, PIN, etc. Note that some or all of this information may have been obtained earlier, such as through user entry or automatic transmission by the user device, so that any previously obtained information would not be needed again. This information is used by the service provider to locate the user's account and determine whether the payment can be approved. The determination may include looking at any account limitations or restrictions, such as limits set by the user and/or the service provider, and fraud analysis, such as using the user location and merchant store location. For example, if the user device and merchant store are located apart from each other (such as separated by over 100 miles), the request may be denied or further authentication by the user may be required.

After processing, the service provider may then transmit a notification to the user and/or the merchant. If the payment request is denied, the user and/or the merchant may be notified via text, email, voice, or other means, that the payment was not processed and reasons provided to the user if applicable. The user may resubmit information as needed.

If the payment request is approved, a confirmation may be sent to the merchant device and/or the user device, such as via text, email, voice, or other means. The payment provider may generate a receipt showing details of the transaction, including an indication that payment was made. The receipt may be stored on the user device and capable of being retrieved and displayed. The user may then take possession of the purchased items, such as by going to the store and showing a receipt on the mobile device, a user ID, or other confirmation of purchase. For example, the merchant may receive a confirmation ID on the merchant device, and when the user shows a corresponding ID on the user device, the merchant may release the item. In the case of a donation, the user may simply be provided an electronic receipt of the donation, which may be printable.

In one embodiment, the viewable surface is a store display window where the store is closed or unmanned. Because the user or consumer interacts with the projected information on the viewable surface, no actual person is needed to assist the user with his selection and purchase. Thus, merchants may take advantage of online transactions to increase sales or purchases, even at unmanned or closed stores.

In another embodiment, a user drives up to drive-through restaurant, and the menu is projected onto the car window. The user selects items off the menu, adds them to his cart, and pays for the items through his mobile device.

Figure 2:
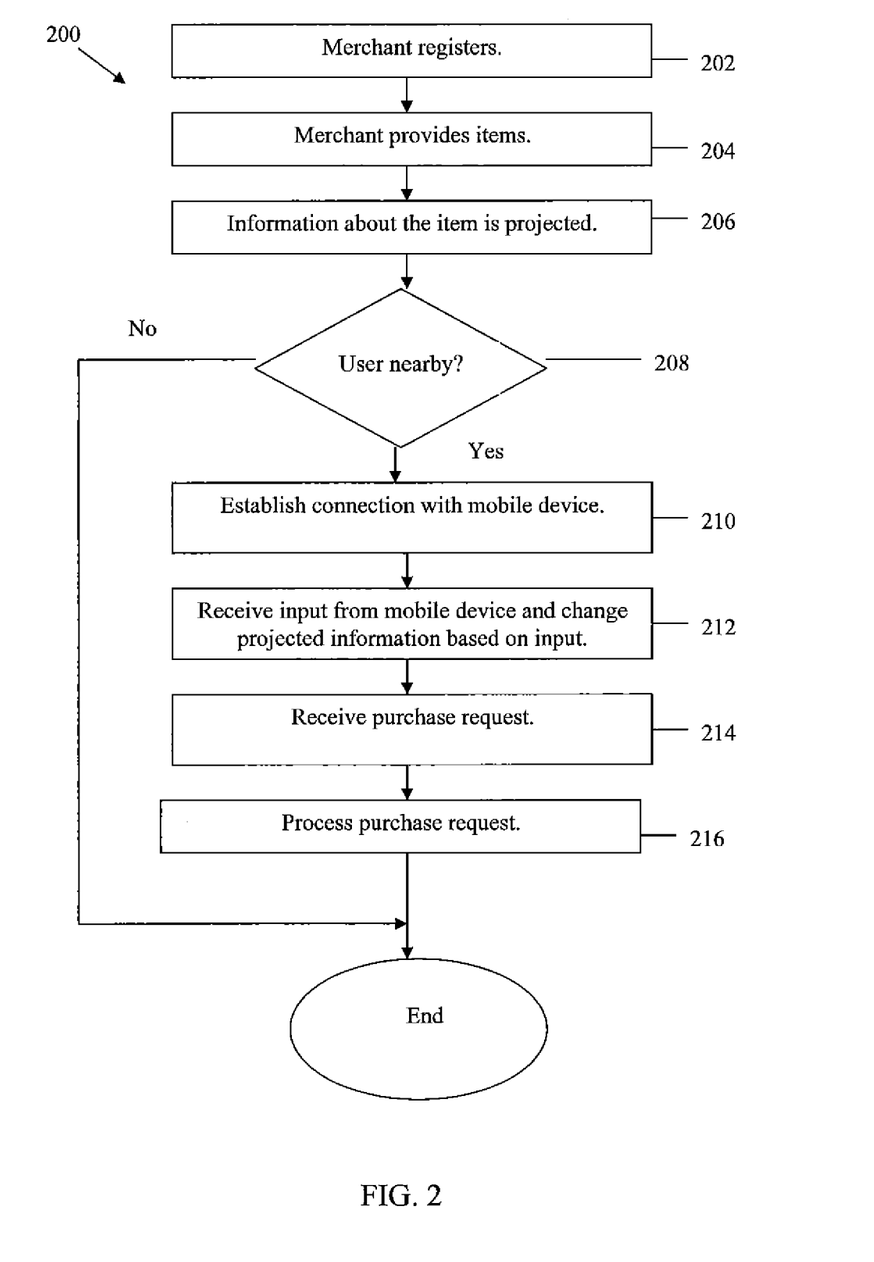
FIG. 2 is a flowchart showing a method of making purchases through a mobile device at a physical location according to another embodiment.

FIG. 2 is a flowchart 200 showing another embodiment of making purchases through a mobile device at a physical location. Steps 202 through 206 are similar to steps 102 through 106 of FIG. 1, and thus, the descriptions of these steps are omitted for brevity. At step 208, location information of the user may first be obtained before allowing the user to connect to the content and control the projected information on the viewable surface. The user should be sufficiently close to the viewable surface to be able to see the projected information. Location information may include GPS coordinates or a street address, including city, state, and/or zip code. The merchant may also manually enter a location of the viewable surface through a merchant device, where the location is then communicated to the service provider. The location information may also be obtained by the service provider using location information from a merchant device. For example, the service provider may use the location (e.g., GPS coordinates) of the merchant device where the merchant store is located. This allows the service provider to obtain location information from merchants without the merchants having to manually enter location information.

Once the merchant has its store set up with the service provider, the following steps may be performed to allow users to purchase items from the store. The service provider determines whether a user is near the viewable surface. The user location may be determined by the service provider from location information transmitted or received from the user's mobile device. For example, the user may allow the service provider to use location information from the user device or the user may enter a specific location, such as an address, and transmit that location to the service provider.

Once the user location is determined, the service provider determines whether that location is nearby. "Nearby" may be defined by the user, the service provider, the merchant, and/or be dependent on the type of location. For example, the user may select a "near" distance, such as within 0.1 mile of the viewable surface. The distance may be determined by the service provider and may vary depending on location and other factors, such as the size of the projection screen. For example, a dense area, such as a shopping mall or swap meet, may have a shorter distance than rural or sparsely populated areas. A "nearby" area may be different if the user is in a small coffee shop as opposed to a large museum. A user may be too far away if a projection screen is a smaller size (e.g., a small window in a mall store), even though that same distance may be appropriate for a projection screen that is much larger (e.g., a store front floor-to-ceiling window). Thus, the distance from the user may be determined in any number of ways.

If the distance between the user and viewable surface is too large, the system provider sends a message to the user's mobile device that the user is too far from the viewable surface. If it is determined that the user is close enough to the viewable surface, the service provider allows the user to continue shopping. The user can then control the projected information on the surface, make purchases through the mobile device, and receive the purchased items.

Figure 3:
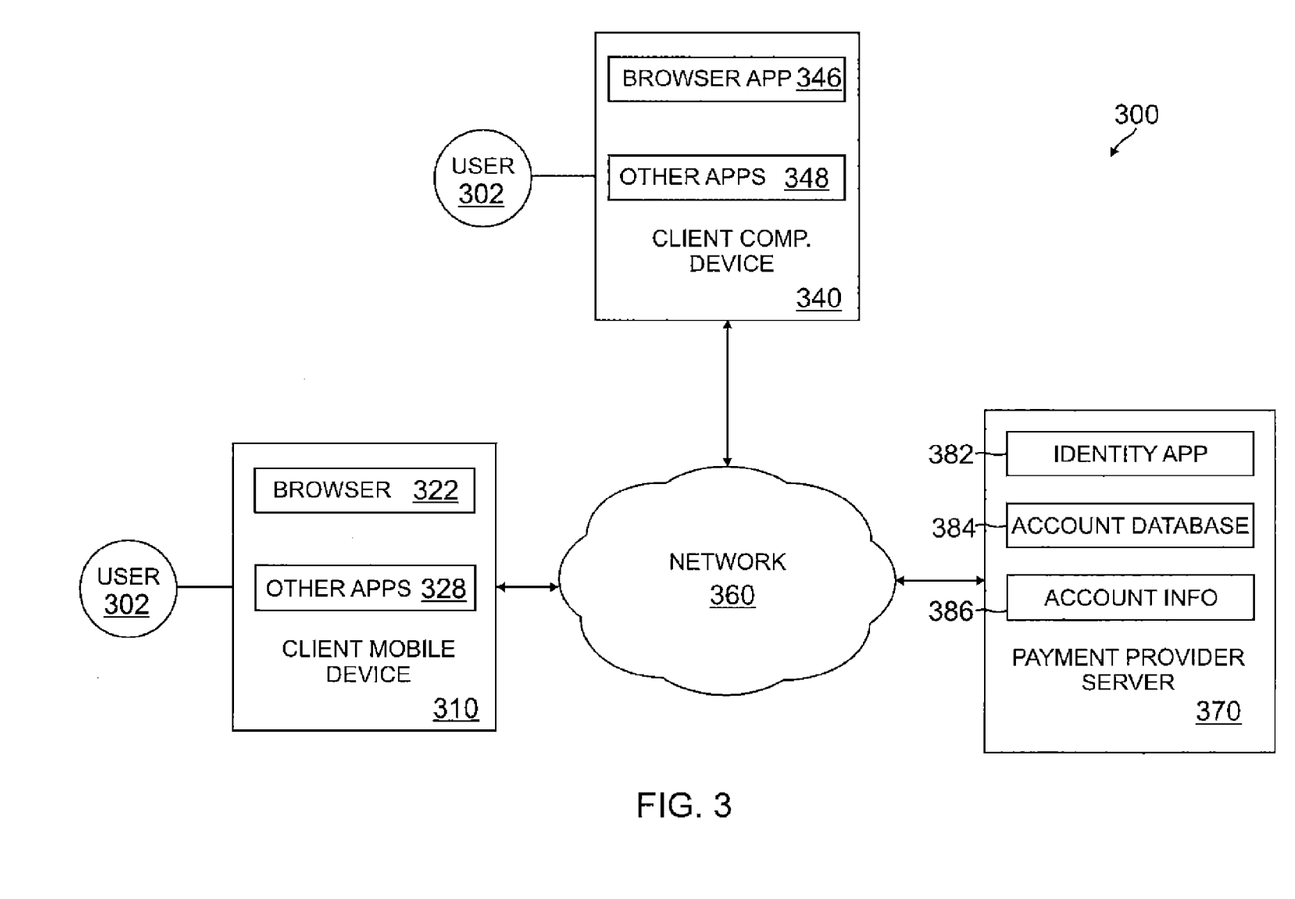
FIG. 3 is a block diagram of a networked system suitable for implementing the processes described herein according to an embodiment.

FIG. 3 is a block diagram of a networked system 300 used in shopping and making a payment through a mobile device, such as described above, according to an embodiment of the invention. System 300 includes a client device 310, a merchant device 340, and a payment service provider server 370 in communication over a network 360. Payment service provider server 370 may be maintained by a payment provider, such as PayPal, Inc. of San Jose, Calif. Server 370 may be maintained by other service providers in different embodiments.

Network 360, in one embodiment, may be implemented as a single network or a combination of multiple networks. For example, in various embodiments, network 360 may include the Internet and/or one or more intranets, landline networks, wireless networks, and/or other appropriate types of communication networks. In another example, the network may comprise a wireless telecommunications network (e.g., cellular phone network) adapted to communicate with other communication networks, such as the Internet.

Client device 310, in one embodiment, may be implemented using any appropriate combination of hardware and/or software configured for wired and/or wireless communication over network 360. For example, client device 310 may be implemented as a smart phone of a user 302 (e.g., a client or customer) in communication with network 360. In other examples, client device 310 may be implemented as a computing tablet, a PC, personal digital assistant (PDA), notebook computer, and/or various other generally known types of wired and/or wireless computing devices. It should be appreciated that, in various embodiments, client device 310 may be referred to as a user device or a customer/client device without departing from the scope of the present disclosure.

Client device 310, in one embodiment, may include one or more browser applications 322 which may be used to provide a user interface to permit user 302 to browse information available over network 360. For example, browser application 322 may be implemented as a web browser to view information available over network 360. In one implementation, browser application 322 comprises a software program, such as a graphical user interface (GUI), executable by a processor that is configured to interface and communicate with the one or more merchant devices 340 and payment provider server 370 via network 360. For example, user 302 is able to access merchant websites to find and purchase items. User 302, through client device 310, may also communicate with payment provider server 370 to create an account and make a payment to the merchant.

As such, client device 310, in one embodiment, may include other applications 328 as may be desired in one or more embodiments to provide additional features available to user 302, including receiving available local items and making payments with payment provider server 370. For example, applications 328 may include interfaces, apps, and communication protocols that allow the user to receive and transmit information through online sites and payment provider server 370. Applications 328 may also include security applications for implementing client-side security features, programmatic client applications for interfacing with appropriate application programming interfaces (APIs) over network 360 or various other types of generally known programs and/or applications. Client device 310 may also include a location application that enables the location of the client device to be determined and conveyed to others, such as a payment provider. Such applications are commonly known.

Merchant device 340, which can be similar to client device 310, may be maintained by one or more service providers (e.g., merchant sites, auction site, marketplaces, social networking sites, etc.) offering various items, such as products and/or services, through stores created through the service provider or their websites. Merchant device 340 may be in communication with a merchant server capable of handling various on-line transactions. The merchant (which could be any representative or employee of the merchant) can process online transactions from consumers making purchases through the merchant site from mobile devices. Merchant device 340 may include purchase application 342 for offering products/services for purchase.

Merchant device 340, in one embodiment, may include a browser application 346 and other applications 348, similar to browser application 322 and applications 328 in client device 310. Browser application 346 and applications 348 enable the merchant to access a payment provider web site and communicate with payment provider server 370, such as to convey and receive information to allow the merchant to provide location and item information to the payment provider. Applications 348 may also include location-determination capabilities and interfaces to allow unmanned transactions with a user. As described in greater detail herein, embodiments of the present disclosure provide a way for merchants to sell items to or receive payments from consumers online, even when the merchant does not have a website or a manned store.

Payment provider server 370, in one embodiment, may be maintained by an online payment provider, which may provide processing for online financial and information transactions on behalf of user 302 with a merchant. Payment provider server 370 may include at least one identity application 382, which may be adapted to interact with the client device 310 and/or merchant device 340 over network 360 to facilitate the purchase of items, products and/or services by user 302, including donations made by the user.

Payment provider server 370, in one embodiment, may be configured to maintain a plurality of user and merchant accounts in an account database 384, each of which may include or be separate from an account information 386 associated with individual users, including user 302, and one or more merchants or sellers associated with one or more merchant devices 340. For example, account information 386 may include identity information of user 302 and merchants, such as one or more full names, business names, street addresses, email addresses and phone numbers, website addresses, or other types of financial information, which may be used to facilitate online transactions between user 302 and merchants. Account information or identity application may also include location information of both users and merchants and item information within specific locations of merchants. As such, payment provider server 370 may notify a user device when a user device is nearby one or more merchant locations and to provide the user device with a listing of available items for purchase at that location.

Figure 4:
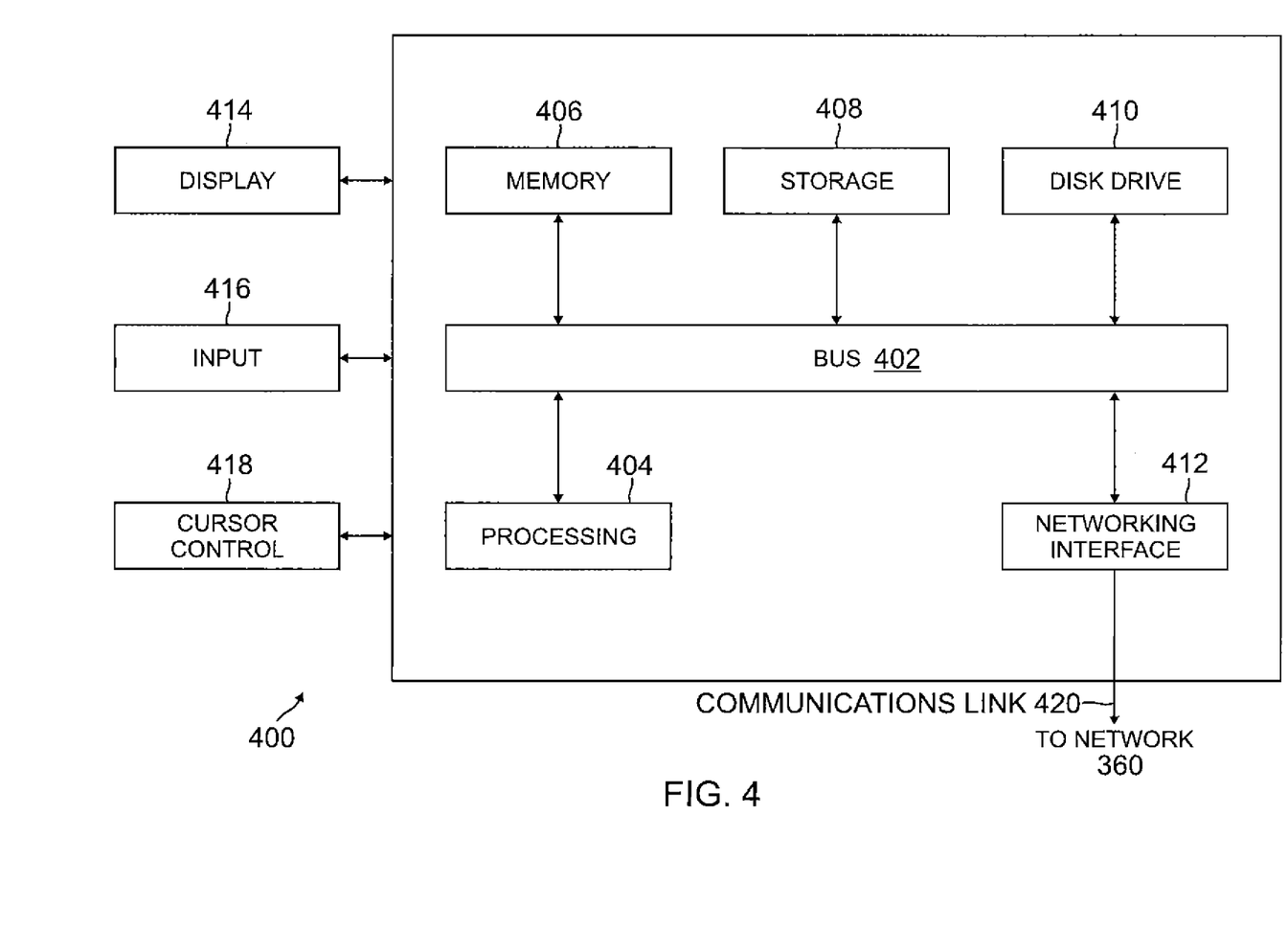
FIG. 4 is a block diagram of a computer system suitable for implementing one or more components in FIG. 3 according to one embodiment of the present disclosure.

FIG. 4 is a block diagram of a computer system 400 suitable for implementing one or more embodiments of the present disclosure. In various implementations, the user and/or merchant device may comprise a personal computing device (e.g., a personal computer, laptop, smart phone, PDA, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

In accordance with various embodiments of the present disclosure, computer system 400, such as a personal computer and/or a network server, includes a bus 402 or other communication mechanism for communicating information, which interconnects subsystems and components, such as a processing component 404 (e.g., processor, micro-controller, digital signal processor (DSP), etc.), a system memory component 406 (e.g., RAM), a static storage component 408 (e.g., ROM), a disk drive component 410 (e.g., magnetic or optical), a network interface component 412 (e.g., modem or Ethernet card), a display component 414 (e.g., CRT or LCD), an input component 416 (e.g., keyboard, keypad, or virtual keyboard), and a cursor control component 418 (e.g., mouse, pointer, or trackball). In one implementation, disk drive component 410 may comprise a database having one or more disk drive components.

In accordance with embodiments of the present disclosure, computer system 400 performs specific operations by processor 404 executing one or more sequences of instructions contained in system memory component 406, such as described above with respect to the consumer, merchant, and/or payment provider in FIGS. 1 and 2. Such instructions may be read into system memory component 406 from another computer readable medium, such as static storage component 408 or disk drive component 410. In other embodiments, hard-wired circuitry may be used in place of or in combination with software instructions to implement the present disclosure.

Logic may be encoded in a computer readable medium, which may refer to any medium that participates in providing instructions to processor 404 for execution. Such a medium may take many forms, including but not limited to, non-volatile media, volatile media, and transmission media. In one embodiment, the computer readable medium is non-transitory. In various implementations, non-volatile media includes optical or magnetic disks, such as disk drive component 410, volatile media includes dynamic memory, such as system memory component 406, and transmission media includes coaxial cables, copper wire, and fiber optics, including wires that comprise bus 402. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by a communication link 420 to the network (e.g., such as a LAN, WLAN, PTSN, and/or various other wired or wireless networks, including telecommunications, mobile, and cellular phone networks) may perform instruction sequences to practice the present disclosure in coordination with one another.

Computer system 400 may transmit and receive messages, data, information and instructions, including one or more programs (i.e., application code) through communication link 420 and a communication interface 412. Network interface component 412 may include an antenna, either separate or integrated, to enable transmission and reception via communication link 420. Received program code may be executed by processor 404 as received and/or stored in disk drive component 410 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

What is claimed is:

1. A method for making purchases at a physical location, comprising:
   receiving, by a processor of a service provider, information about an item available for purchase, wherein the information is sent from a mobile device of a user;
   causing projecting, by a projector, of an image of the information on a surface different from a display of the mobile device;
   causing a code to be provided on the surface;
   receiving, by the processor, input from the mobile device;
   changing, by the processor, the projected image of the information based on the input, wherein the user enters the code provided on the surface into the mobile device to interact with the projected image of the information;
   receiving, by the processor, a payment request through the mobile device, wherein the request comprises information about a selected item for purchase; and
   processing, by the processor, the payment request.

2. The method of claim 1, wherein the surface comprises glass.

3. The method of claim 2, wherein the glass forms part of a store display window.

4. The method of claim 1, wherein the surface comprises a photographic or holographic film.

5. The method of claim 1, further comprising determining, by the processor, information about a user location from the mobile device.

6. The method of claim 5, further comprising determining, by the processor, information about a location of the surface.

7. The method of claim 6, further comprising determining a distance between the user location and surface location.

8. The method of claim 7, wherein if the distance exceeds a certain distance, the processor sends a message to the mobile device.

9. The method of claim 1, wherein only one user provides input at any time.

10. The method of claim 1, wherein changing the projected information comprises changing the item, rotating the item, changing the color of the item, selecting the size of the item, or combinations thereof.

11. A system, comprising:
    a memory device storing user account information, wherein the user account information comprises information about a plurality of items available for purchase from a merchant, the items capable of being projected on a surface different from a display of a mobile device of a user; and
    a processor operable to:
      receive information about an item available for purchase from a mobile device of a user;
      cause an image projection, by a projector, of the information on a surface different from a display of the mobile device, the surface comprising a visible code;
      cause receiving of the code visible on the surface from the mobile device, the visible code having been entered by the user into the mobile device, wherein the caused receiving enables the user to interact with the image projection of the information;
      receive input from the mobile device;
      change the image projection of the information based on the input;
      receive a payment request through the mobile device, wherein the payment request comprises information about a selected item for purchase; and
      process the request.

12. The system of claim 11, wherein the surface comprises glass and the glass forms part of a car window.

13. The system of claim 11, wherein the processor is further operable to determine information about a user location from the mobile device.

14. The system of claim 13, wherein the processor is further operable to determine information about a location of the surface.

15. The method of claim 14, wherein the processor is further operable to determine a distance between the user location and surface location.

16. The method of claim 15, wherein if the distance exceeds a certain amount, the processor sends a message to the mobile device.

17. A non-transitory machine-readable medium comprising a plurality of machine-readable instructions which when executed by one or more processors of a server are adapted to cause the server to perform a method comprising:
    receiving information about an item available for purchase from a mobile device of a user;
    causing projecting, by a projector, of an image of the information on a surface different from a display of the mobile device, wherein the surface comprises a visible code;
    causing receiving of the code visible on the surface from the mobile device, the visible code having been entered by the user into the mobile device;
    causing enabling, of the user, to interact with the image projection of the information in response to the caused receiving the visible code;
    receiving input from a mobile device;
    changing the projected image of the information based on the input, wherein the user enters a code provided on the surface into the mobile device to interact with the projected image of the information;
    receiving a payment request through the mobile device, wherein the payment request comprises information about a selected item for purchase; and
    processing the request.

18. The non-transitory machine-readable medium of claim 17, wherein the surface comprises glass.

19. The non-transitory machine-readable medium of claim 17, wherein changing the projected information comprises changing the item, rotating the item, changing the color of the item, selecting the size of the item, or a combination thereof.

20. The non-transitory machine-readable medium of claim 17, wherein the method further comprises determining information about a user location from the mobile device, determining information about a location of the surface, and comparing the user location to the surface location.

* * * * *